Aug. 4, 1942. F. H. MUELLER ET AL 2,291,979
APPARATUS FOR EQUIPPING BRANCH LINES AND THE LIKE
Filed July 17, 1940 4 Sheets-Sheet 2
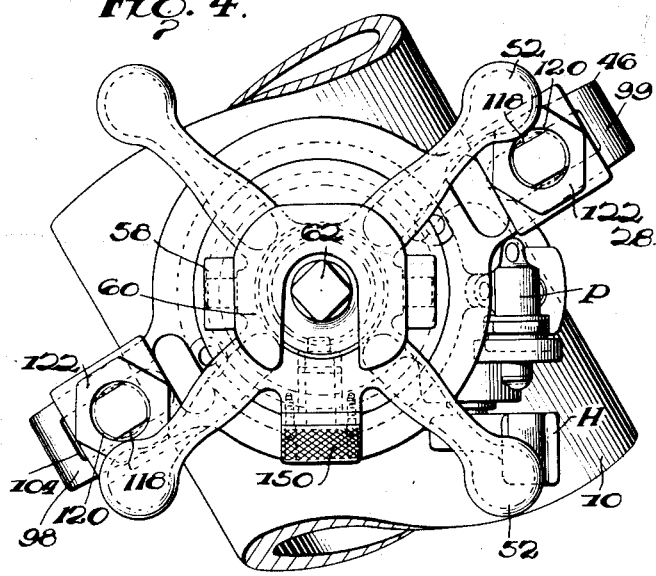
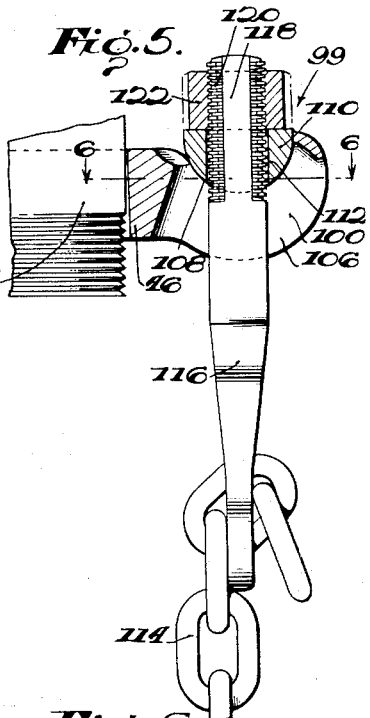
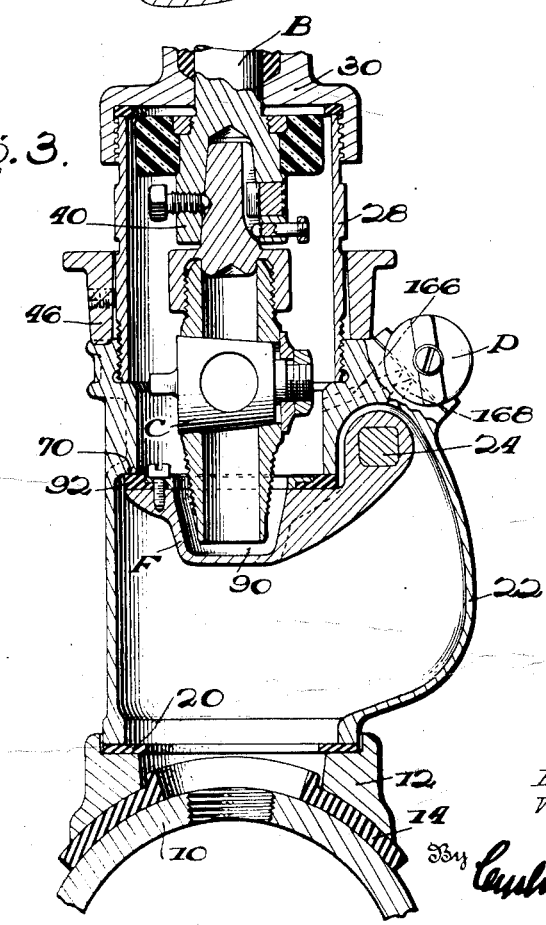
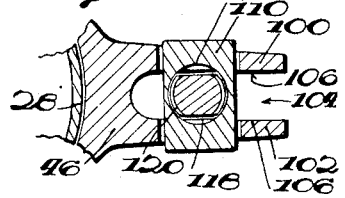
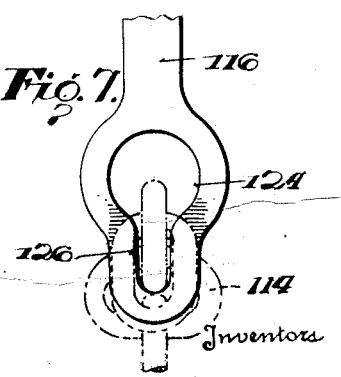
Inventors
Frank H. Mueller.
Walter J. Bowan.
By Cushman, Darby, & Cushman
Attorneys

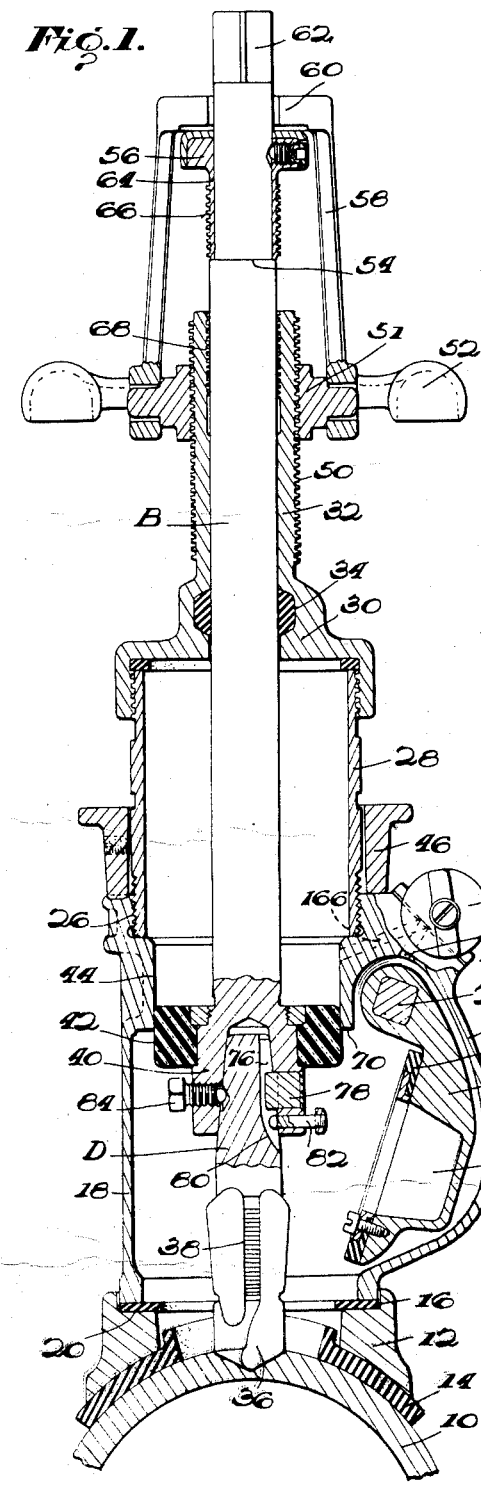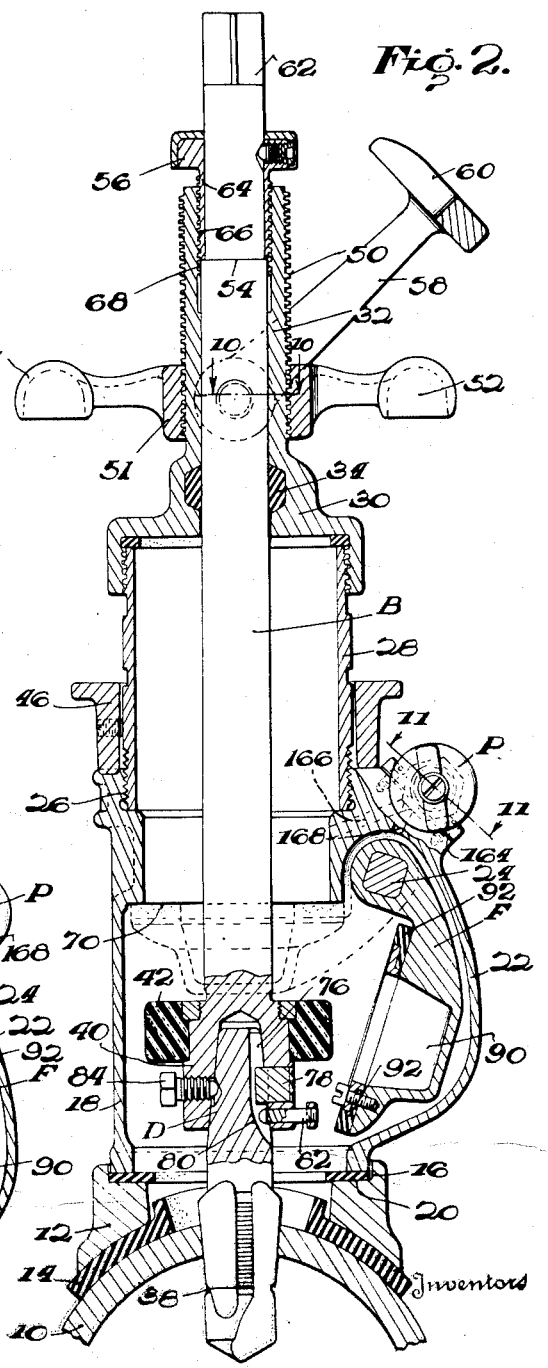

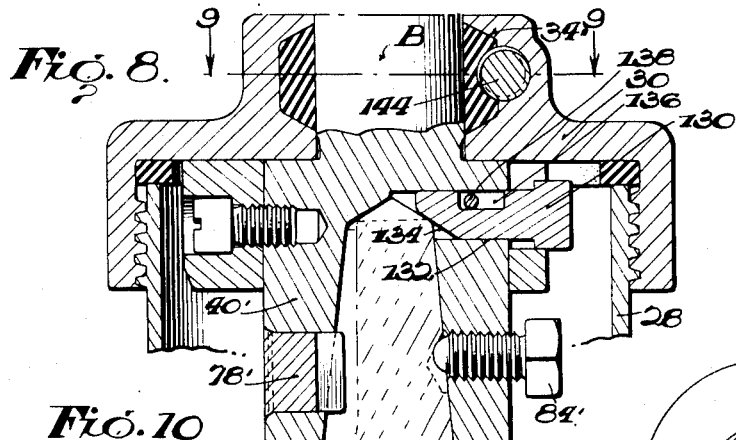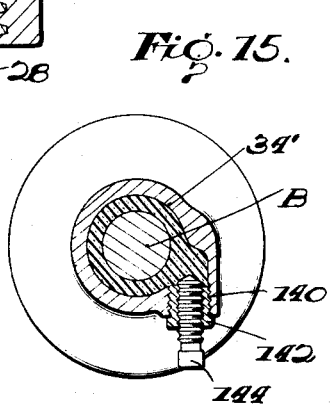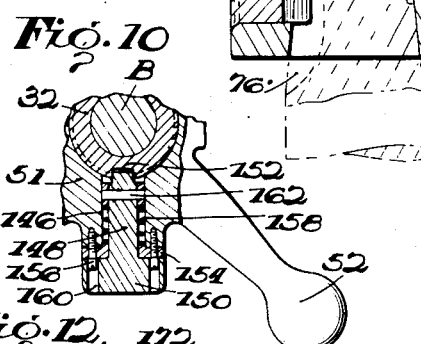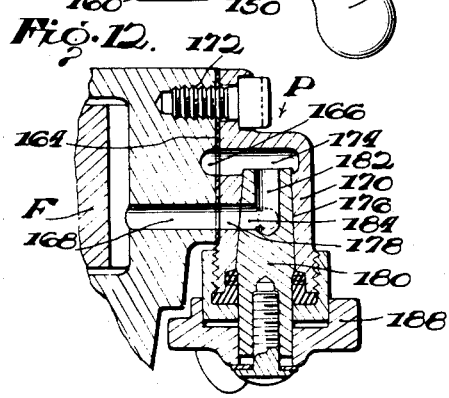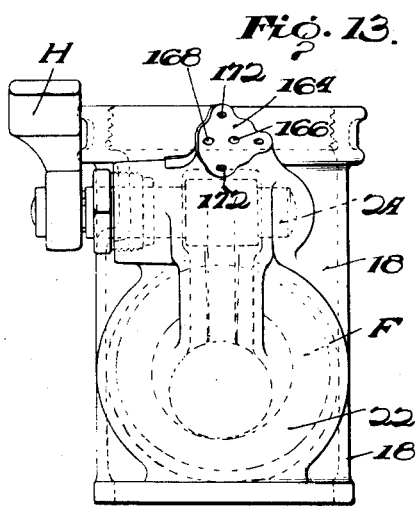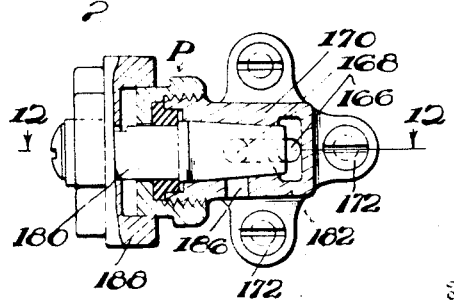

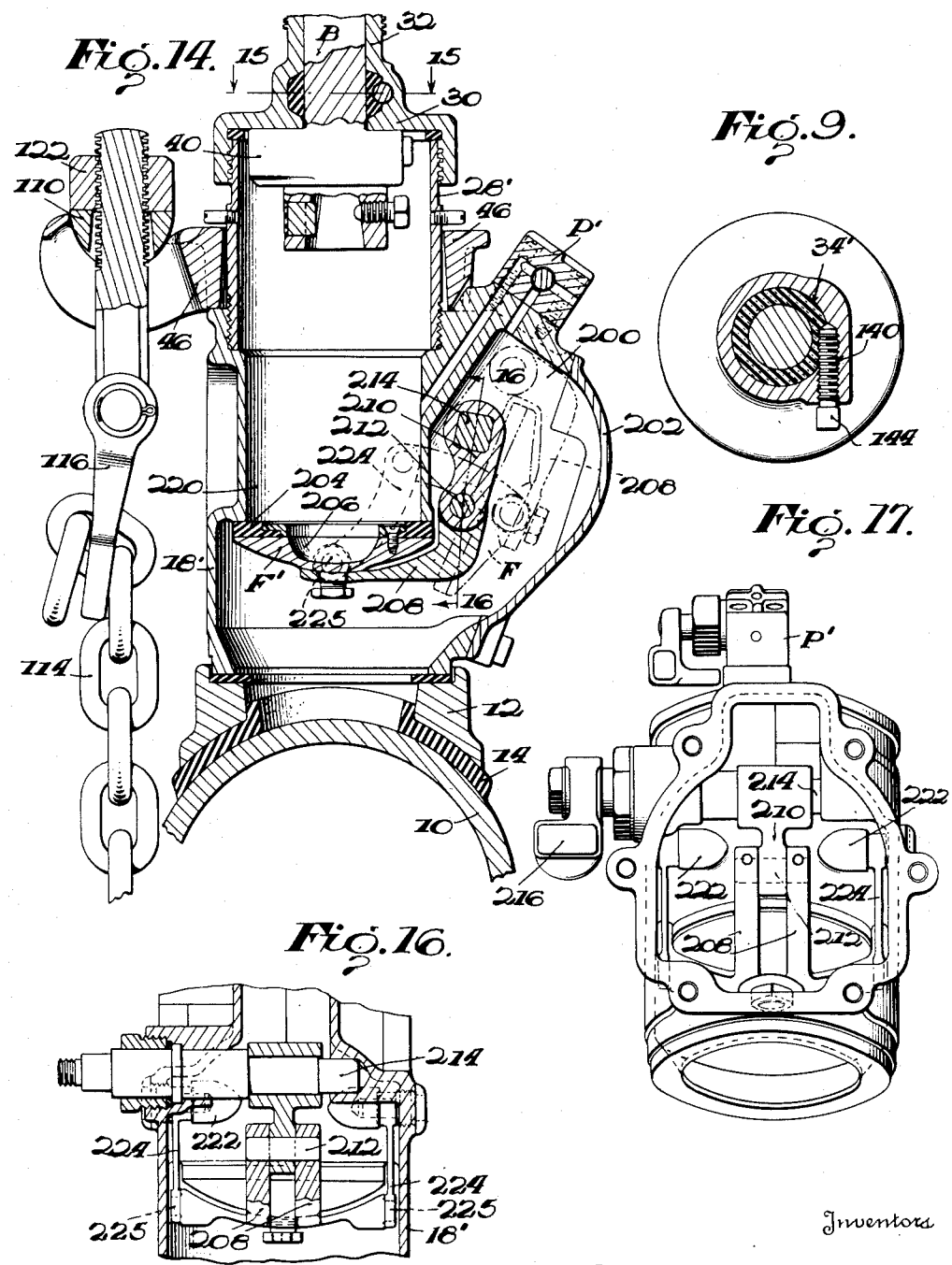

Patented Aug. 4, 1942

2,291,979

UNITED STATES PATENT OFFICE 2,291,979

APPARATUS FOR EQUIPPING BRANCH LINES AND THE LIKE

Frank H. Mueller and Walter J. Bowan, Decatur, Ill., assignors to Mueller Co., Decatur, Ill., a corporation of Illinois Application July 17, 1940, Serial No. 346,052

1 Claim. (Cl. 77—40)

The present invention relates to tapping machines of the type adapted to cut an opening in a fluid chamber to provide an outlet therefrom, and to thread the cut opening to receive a valve body for controlling flow through the outlet. Such operations are customary, for instance, in attaching lateral or branch line connections to a fluid conduit, for instance, to a water or gas main.

One of the principal objects of the invention is to provide such a tapping apparatus of simple compact construction and of reduced size. The compactness of the apparatus makes possible its use in confined spaces, for instance, between closely adjacent walls of a building or of other construction.

Another object of the invention is to provide such apparatus having separate means for advancing a cutting and tapping bar during the respective cutting and tapping operations. The means for advancing the bar during the cutting operation is relatively rugged, whereas the means for controlling its advance during the tapping operation is of finer construction to accurately regulate the formation of the tapped threads to the desired pitch.

Another object of the invention is to provide tapping apparatus with improved means for guiding the cutting bar in accurate alignment at the time when the bit is cutting the opening through the curved wall of the chamber or conduit.

It is also an object of the invention to improve various features of such a cutting and tapping apparatus, in order to simplify its construction and improve its manner of operation, as set forth below.

The drawings illustrate several forms of cutting and tapping apparatus made in accordance with the invention, it being understood that the constructions shown are susceptible of considerable modification within the range of the invention:

Figure 1 is a central vertical sectional view of a cutting and tapping apparatus attached to a main, showing the position of the drilling bar at the time the bit is commencing to cut into the wall of the main.

Figure 2 is a view similar to Figure 1, showing a subsequent condition of the apparatus when the bit is tapping threads in the previously cut opening in the main.

Figure 3 is a vertical sectional view of a portion of the apparatus, similar to Figures 1 and 2, but showing the apparatus in condition when a valve body, such as a corporation cock, is being inserted through the apparatus toward the previously cut and tapped opening in the main.

Figure 4 is a top plan view of the apparatus, looking down toward the conduit which is being operated upon.

Figure 5 is a partial vertical sectional view of the apparatus, taken through one side of the chain yoke employed to rigidly attach the apparatus to the main.

Figure 6 is a partial horizontal sectional view taken along the line 6—6 of Figure 5.

Figure 7 is a side elevational view of one of the chain harps as shown in Figure 5.

Figure 8 is an enlarged partial vertical sectional view of the fluid chamber bonnet of the apparatus, showing one manner of attaching a tool or part to the lower end of the drilling bar.

Figure 9 is a horizontal sectional view taken along the line 9—9 of Figure 8.

Figure 10 is a partial horizontal sectional view taken, for instance, along the line 10—10 of Figure 2, showing a device employed to thread the bonnet onto the fluid chamber of the apparatus.

Figure 11 is a sectional view of the bypass valve of the apparatus taken, for instance, along the line 11—11 of Figure 2.

Figure 12 is a sectional view showing details of the bypass valve, taken along the line 12—12 of Figure 11.

Figure 13 is a side elevational view of a portion of the apparatus, with the bypass valve removed.

Figure 14 is a vertical sectional view of a modified form of the apparatus, showing a different type of flop valve.

Figure 15 is a horizontal sectional view taken along the line 15—15 of Figure 14.

Figure 16 is a sectional view taken along the line 16—16 of Figure 14, illustrating details of construction of the modified type of flop valve, and Figure 17 is a side elevational view of the modified apparatus of Figure 14, with the side cover of the flop valve chamber removed, and showing a construction of this valve and its actuating parts.

In Figure 1, a curved wall chamber such as a gas or water main is shown at 10, and mounted thereon is the usual malleable iron saddle 12 which bears against a gasket 14. The saddle 12 has an opening therethrough, and at the outer end of the opening a counterbore 16 is formed, which counterbore receives the body 18 of the flop valve chamber, the lower end of said body engaging a gasket 20 resting within the counterbore 16.

The body 18 is hollow and bulges outward sufficiently on one side thereof as at 22 to receive a dished flop valve F when the latter is in open or inoperative position as shown in Figures 1 and 2. The flop valve F is carried by a shaft 24, journaled in the walls of the body, and having a central squared portion to which the flop valve is secured, so that when the shaft is turned, in the well known manner, the flop valve is moved between open and closed positions.

The upper end of the flop valve body 18 is interiorly threaded as at 26 and secured thereto is a cylinder 28 which forms a fluid chamber with the flop valve body around the opening in the main. The operations required in equipping the conduit 10 with a branch line are performed through this chamber, including the insertion of a corporation cock into the opening cut in the main. It is a purpose of the invention to so simplify the parts, that the length of the cylinder 28 may be reduced, thus effecting economy in construction and making the apparatus more convenient in use, particularly in confined spaces.

The upper end of the cylinder 28 is closed by a bonnet 30, which bonnet is threaded to the upper end of the cylinder in fluid tight engagement therewith, for instance, by means of an appropriate gasket, as shown.

The bonnet has an upwardly extending cylindrical portion 32, through which an operating bar B is adapted to extend into the fluid chamber, and this upwardly extending portion of the bonnet is constructed to receive the parts which are operated to move the operating bar longitudinally through the apparatus, and to turn said bar, in order to perform the cutting, tapping, and corporation cock inserting operations previously mentioned, and well known in the art. The longitudinal opening in the bonnet is enlarged adjacent its lower end as at 34 to receive packing which forms a seal around the bar B during its operation.

A bypass valve P is employed to control communication between the portions of the fluid chamber above and below the flop valve seat to facilitate the tight engagement of said flop valve wits its seat, and the subsequent opening of said valve.

The lower end of the bar B is constructed to removably carry a drilling bit D. The lower end of said bit comprises a cutting portion 36, and its upper end is suitably threaded to provide a tapping portion 38. By means hereinafter described, the operating bar B is moved longitudinally through the fluid chamber until the end of the bit engages the main 10, and thereafter the bar B is turned so that the bit cuts an opening in the main, longitudinal cutting pressure being suitably applied as hereinafter described. As further described hereinafter, when the end of the bit D has cut through the wall of the main, regulated turning means comes into play to control the rotation and advance of the bar B so that threads of the desired pitch are tapped in the previously cut opening in the main, by the tapping portion 38 of the bit.

The lower end of the bar B has an enlarged holder 40 which removably carries the drill D. Suitably secured to the outside of this head is a guide collar 42, of substantial diameter, which collar may be made of metal, rubber or leather. The opening through the flop valve body 18 is reduced adjacent its upper end, as at 44, to form an accurately machined guiding cylindrical portion to receive the guide 42, which also has a cylindrical periphery. The guide 42 engaging the guide cylinder 44 properly maintains the bit D in accurate alignment during the initial cutting of the opening into the curved wall of the main 10, and prevents side shifting of the bar during this cutting operation. It will be evident that the accurate cutting of the opening through the wall of the main, facilitates the subsequent and necessarily more refined thread tapping operation. The above described guide is obviously a simple yet effective expedient, making unnecessary the use of pilot drills or other more complicated guiding means.

Before the bonnet 30 is positioned on the cylinder 28, a chain collar 46, the details of which will be hereinafter described, is placed over the outside of the cylinder, resting against the upper end of the flop valve body 18. A retaining chain or strap is secured to opposite sides of the collar 46 in a manner hereinafter described, and this chain passes downwardly around the conduit 10 and holds the entire assembly rigidly against the outer wall of said conduit.

The upwardly extending portion 32 of the bonnet 30 is provided with relatively heavy exterior threads 50 for the major portion of its length. These threads receive and coact with similar threads on a feed collar 51, which collar has suitable operating handles 52 extending therefrom.

The bar B has a shoulder 54 adjacent its upper end, and removably sleeved on the bar against said shoulder is a feed regulating thrust collar 56, which may be retained on the bar in any appropriate way, as by means of a locking screw. A yoke 58 of well known construction is pivotally carried by the said feed collar 51, as is well known in the art, and the upper end 60 of said yoke contacts the top of the thrust collar 56 and thereby imparts a downward longitudinal force thereto, and to the bar B, when the feed screw is turned on the threads 50. The upper end 62 of the bar B has flat sides for the engagement of a wrench employed in the conventional manner to turn the bar B. The upper end 60 of the yoke 58 is substantially U-shaped, as shown in Figure 4, to embrace the bar B when it engages the thrust collar 56.

The thrust collar 56 has a depending cylindrical sleeve 64 having relatively fine regulated threads 66 thereon, which are intended to engage similar threads 68 of the same pitch on the interior of the extension 32 of the bonnet. The threads 66 and 68 are of the same pitch as the threads 38 on the cutting and tapping bit D, and are much finer than the threads 50 on the exterior of the bonnet extension 32.

In the operation of the machine as described above, the flop valve body 18 and the cylinder 28 are secured to the main 10, and tightly held thereon by the well-known chain, opposite ends of which are attached to the chain collar 46. When the apparatus is thus assembled to the main, the operating bar B is in place, extending into the cylinder 28 and having the proper drilling and tapping bit D secured to the lower end thereof. The interior of the cylinder 28 and the flop body 18 form a fluid-tight fluid chamber. The feed collar 51 is then rotated and moves downwardly along the bonnet extension 32 with the top 60 of the yoke 58 engaging the thrust collar 56 on the bar B. The bar B is thus moved downwardly until the bit D encounters the main

10. At this time, the cutting operation is to be commenced, and as longitudinal thrust is applied to the bit D and against the wall of the main 10 by rotation of the feed screw 51, the bar B is turned by a suitable wrench engaging its end 62 and whereupon the lower cutting portion of the bit cuts an opening through the wall of the main 10 as shown in Figure 1. It will be noted that during this cutting operation, the threads 66 carried by the thrust collar 56 are not in engagement with the threads 68 in the interior of the extension 32 of the bonnet.

As the opening is thus cut through the main, continued rotation of the feed screw 51 brings the tapping portion 38 of the bit into engagement with the opening cut through the main. The apparatus is so designed that, just prior to the engagement of the tapping threads with the previously cut opening, the threads 66 on the thrust collar 56 engage the threads 68 in the bonnet extension 32, so that the tapping threads enter the opening in the main already advancing at the proper rate. As previously pointed out, the pitch of these threads is the same as that on the tapping portion 38 of the bit. When these threads engage, the longitudinal feed of bar B is exactly regulated, and yoke 58 is disengaged or swung back from thrust collar 56 as shown in Figure 2. The bar B is turned by a wrench engaging its end 62. Threads of exact pitch desired are thus tapped in the opening through the main, this operation being illustrated in Figure 2. When threads 66 and 68 are in engagement, operation of the feed collar 51 will not be required. The tapping may be performed by simply turning the bar B.

It will be understood that the apparatus is designed to receive bits of various sizes, to cut and thread openings of various sizes, and to insert corporation cocks of different sizes. Furthermore, bits may be used having tapping threads of various pitch, as desired, and bonnets having different corresponding threads may be substituted. The thrust collar 56 with its sleeve 64 is removable from the bar B, so that a different collar having threads 66 of different pitch, corresponding with those of the bit, may be used. When the opening has been cut in the main, any fluid under pressure in the latter escapes through the opening into the interior of the apparatus. For this reason, it is well known in the art to control this fluid with a flop valve, a type of which is shown at F. At the termination of the tapping operation, the bar B is elevated until the cutting and tapping bit is above the valve seat 70 formed in the flop valve body 18 at the lower end of the guide portion 44 thereof. With the bit thus elevated, the squared shaft 24 may be turned by its handle H to cause the flop valve F to engage its seat. The closed flop valve completes the formation of an outer fluid tight chamber within the cylinder 28, and an inner fluid tight chamber within the body 18. When the flop valve is seated, the bypass valve P is operated, as is well known in the art, to release fluid under pressure from the fluid chamber above the flop valve. The differential pressure thus created on opposite sides of the flop valve causes it to be tightly held against its seat. When so held, the bonnet 30 may be removed from the cylinder 28, and the cutting and tapping bit may then be removed from the bar B. A tool employed in subsequent operations may then be substituted for the bit D, or a valve body or corporation cock may be attached to the lower end of said bar. When this is done, the apparatus is again assembled with the bonnet tightly engaged on the upper end of the cylinder 28 reforming the pressure chamber, and subsequent operations proceed as hereinafter described.

The upper or outer end of the cutting and tapping bit D is provided with a longitudinal guiding slot 76 to hold it against rotation in the holder 40, the latter being provided with a lug 78 which extends into the slot 76. The lower end of the inner surface of the slot 76 is outwardly curved as at 80 and a knock-out pin 82 having a rounded inner end is mounted extending through the lower wall of the holder 40. A lock screw 84 is also provided to retain the bit in place in the holder, as is well known in the art. When the cutting and tapping operations have been completed, and the flop valve has been closed and the bonnet removed, the bit D may be conveniently removed from its wedged engagement in the holder 40, by first releasing the retaining screw 84, and then, giving the knock-out pin 82 a sharp blow with a hammer. The inner rounded end of the knockout pin 82 engages against the inner curved cam surface of the lower end of the slot 76, thus applying an outward force to release the bit D from its retained position in the lower end of the holder 40.

The flop valve F of the present apparatus is of improved construction, as now described, to make more convenient the insertion of such a device as a corporation cock for the previously cut and tapped opening. The design is such that the length of the cylinder 28 may be shortened, in turn making possible the shortening of the over-all length of the apparatus and making possible its use in confined places. Shortening of the cylinder 28 also reduces the distance the bit or corporation cock must be moved to engage the conduit 10.

Referring to Figures 1, 2 and 3, the flop valve F is shown provided with a substantial well 90 extending downwardly from its upper surface, and surrounding this well is a circular gasket 92 suitably held in place as by means of small screws. When the flop valve is closed, as shown in Figure 3, the gasket 92 engages the valve seat 70 on the flop valve body, thus forming a seal between the flop valve chamber and the chamber formed by the cylinder 28. In Figure 3, the holder 40 on the lower end of the bar B is shown carrying a corporation cock C of well known construction, said cock having a lower end suitably threaded to fit in the threads previously tapped in the opening in the main 10. The upper end of this corporation cock is engaged in a tool having a shank formed in a manner similar to the upper end of the bit D, so that it may be carried by the holder and bar B and released therefrom by operation of the same type of knock-out pin.

When the corporation cock is positioned in the chamber formed by the cylinder 28, its lower end extends downwardly into the well 90 of the flop valve F so that a portion of the vertical dimension of the flop valve chamber is used to initially receive the corporation cock when the flop valve is closed. That is, as shown in Figure 3, the lower end of the corporation cock extends a substantial distance below the valve seat 70, although it remains in the outer fluid chamber formed by the cylinder 28. Thus, the length of the cylinder 28 may be reduced.

With the parts in the position shown in Figure 3, the bypass valve P is operated in a manner generally well known in the art to equalize pressure above and below the flop valve, by permitting fluid in the chamber below the flop valve to pass upwardly into the chamber above the same. Thereafter, with pressure equalized, the shaft 24 of the flop valve is turned to move the same to its open position, as in Figures 1 and 2. The bar B may then be moved downwardly as previously described and then turned to thread the lower end of the corporation cock into the tapped opening in the main 10. When the bar B is moved downwardly to position where the threads on the corporation cock come into engagement with the threads in the opening in the main, the cock can be threaded into the opening in the main by simply turning the bar B with a wrench. When the corporation cock is thus rigidly and finally attached, and because its valve is closed when it is inserted, the entire apparatus including the saddle 12 and the gasket 14 may be removed from the main. With the operation thus completed, the branch line is attached to the outer threads of the corporation cock in the usual manner.

Referring to Figures 4, 5 and 6, the chain yoke 46 is provided with diametrically opposed projections or lugs 98 and 99 each having arms 100 and 102 with an opening 104 between the same, said opening having flat inner walls 106. As shown in Figure 5, the top faces of the arms are cut out to form concave cylindrical surfaces 108 and positioned across each pair of arms 102 there is a washer 110 having a lower semi-cylindrical surface which engages the concave surfaces 108. The washer 110 has a flat top surface and a circular vertical opening 112 therethrough.

As previously referred to, the apparatus is rigidly held on to the main by means of one or more straps or chains 114 extending down under the main and having its ends secured to the chain yoke 46. At each end of the chain, there is a chain harp 116 having an upper end which includes diametrically opposed flat sides 118 and threaded areas 120 between said flat sides. The upper end of the chain harp is adapted to be inserted upwardly through the opening 104 between the arms of the chain yoke 46 and through the semi-cylindrical washer 110. The chain is tightened to rigidly maintain the apparatus against the main by nuts 122 which are threaded onto the upper ends of the chain yokes, which nuts bear against the flat tops of the semi-cylindrical washer 110 to tighten the chain until there is sufficient tension of the apparatus against the main to rigidly hold it and form pressure tight seals at the various packed unions. The flat inner sides 106 of the opening 104 between the arms of the chain yokes engage the flat sides 118 of the upper ends of the chain harps, so that as the nuts 122 are tightened, there is no tendency for the chain harps to turn or for the chain to twist. The flat sides 118 also assist in removing sand or mud from the inside of the nut 122.

The lower end of the chain harp is formed as shown in Figure 7, having a circular opening 124 therethrough, large enough to pass entire links of the chain therethrough, and extending below this circular opening is an elongated narrow slot or recess 126, only slightly larger than the thickness of a chain link as shown in Figure 7.

When securing the apparatus to a main, the chain is pulled taut through the chain harps 116 on opposite sides of the apparatus, and one of the chain links is shifted so that its longest axis is disposed laterally across the slot 126 in the lower end of the chain harp. When the nuts 112 are then tightened, this outside laterally disposed link bears against the outer face of the chain harp on opposite sides of the opening 126 thus retaining the chain against movement through the chain harp. It will be understood that sufficient tension is placed on the nuts 122 to securely hold the flop valve body 18 against the saddle 12 and the saddle 12 against the main, so that packings 20 and 14 are compressed sufficiently to form a tight seal.

Figure 8 shows the top part of the cylinder 28, with the bonnet 30 attached thereto and with the lower end of the bar B extending into the outer fluid chamber, there being a holder 40' on the lower end of the bar. A tool or implement, such as a bit or corporation cock, is shown retained in the lower end of the holder, having the guide slot 76' as previously described engaging a guide lug 78' on the holder, there being a locking bolt 84' to retain the implement in place in the holder. In this modification, however, a different type of knock-out device is shown comprising a plunger 130 adapted to be hammered through an opening 132 leading from the upper end of the tool receiving hole in the bottom of the holder. The plunger 130 has a bevelled end surface 134 which engages against the bevelled end of the implement retained in the holder and dislodges the same after the retaining screw 84' is loosened. The plunger 130 has a relatively small slot 136 in its upper surface, and a pin 138 carried by the holder extends through this slot, so that the plunger cannot be entirely removed, or fall from, the holder.

In Figures 8 and 9, an arrangement of packing for rod B is shown with provision for tightening the same as the apparatus is used. The circular cavity 34' in the bonnet is filled with packing, and extending through the side wall of the bonnet at the level of the packing, there is a threaded opening 140 (Figure 9). A packing tightening bolt 144 is tangentially threaded into the collar, entering the packing chamber. When the packing becomes worn, this bolt is threaded inwardly to tighten the packing, which is thus compressed entirely around the rod B.

Another form of rod packing means is shown in Figure 15, substantially identical with that of Figure 9, except that a threaded collar 142 is used between the threaded opening 140 and the threads of the tightening bolt 144. In both Figures 9 and 15, the packing illustrated is of the hydraulic type, and the construction is such that it is accessible from the outside, but it does not change the height of the bonnet nor limit the depth of the tapping or other operations.

In prior art apparatus, it has been the custom to equip the bonnet 30 with special handles in order to thread the same over the upper end of the cylinder 28. In the present apparatus, we have provided means whereby the feed collar 51 may be utilized for this purpose, through its handles 52, to initially thread the bonnet onto the cylinder 28 and to remove and replace said bonnet between the performance of the various operations on a pressure main, as referred to above. As shown in Figure 10, at any desired position on the feed sleeve 51 between the handles 52, there is a radial opening 146 and in said opening a locking plunger 148 having a knurled head 150 is arranged for movement. This locking plunger has an inner end adapted to enter into a slot 152 in the outer wall of the bonnet extension 32, said slot being provided in the threaded area of said extension. There is a ring 154 secured against the feed collar 51 at the outside of and around the opening 146 and a spring 158 in the opening 146 around plunger 148 is held by ring 154 and bears against a collar secured to the plunger 148 by a pin 162. Spring 158 urges the plunger 148 inwardly so that its end may engage in the slot 152 in the bonnet extension. The head 150 of the plunger has a pair of openings 160 therethrough, slightly larger than the heads of the screws 156 which secure ring 154 to the feed collar, and when said openings are aligned with the heads of the screws, the spring 158 forces the plunger inwardly until its end enters the slot 152 in the bonnet extension. With the end of the plunger thus engaged in the slot, the handles 52 are turned to rotate the feed sleeve, this being done before the yoke 58 is engaged with the thrust collar 56 on the bar B, and the turning of these handles causes the bonnet to be threaded tightly onto the upper end of the cylinder 28. When the bonnet has been completely threaded on, the head 150 of the plunger 148 is pulled outwardly and then turned, so that the inner surfaces of the head 150 between the openings 160 ride upon the outer ends of the heads of the screws 156, and at this time, the plunger is completely withdrawn from the slot in the bonnet extension. Therefore, during the operation of moving the bar B inwardly, when cutting and tapping the opening in the main, the feed collar can be rotated about the bonnet extension without rotating the latter, as previously described.

The details of the bypass valve P are shown in Figures 11, 12 and 13. The flop valve body 18, at its upper and outer side, is equipped with a machined surface 164 to receive a valve housing of the type shown in Figures 11 and 12. Passages 166 and 168 terminate at their outer ends in surface 164, passage 166 leading to the outer chamber of the housing of the apparatus above the flop valve seat while passage 168 leads to the inner fluid chamber of said housing below the flop valve seat. The bypass valve has a hollow housing 170 which is secured to the surface 164 by bolts secured in threaded openings 172. One end of the interior of housing 170 comprises a chamber 174 which is constantly in communication with the passage 166 leading to the outer fluid chamber above the flop valve seat. The housing 170 has a conical longitudinal bore 176 leading from the chamber 174, and a transverse port 178 which leads from said bore to the surface 164 where it is aligned with the passage 168 leading to the fluid chamber of the apparatus below the flop valve seat. There is a conical rotatable ground key valve member 180 positioned in the bore 176, and this valve member has a longitudinal passage 182 therein constantly in communication with the chamber 174, and a lateral valve port 184 which may be selectively aligned with the port 178 to establish communication between the passages 168 and 166, thus effecting fluid communication between the inner and outer chambers of the apparatus above and below the flop valve F. The bypass valve member 180 may be further turned to align with the relief port 186, which leads from the bore 176 of the valve housing to the open air. When the plug valve 180 is turned to align the port 184 with the relief port 186, the fluid above the flop valve may be relieved to the outside of the apparatus.

This operation of relieving the pressure is performed, as mentioned above, after any tool or implement is moved outwardly beyond the flop valve and when said valve is then closed, so that the pressure below the valve will keep it sealed. The valve plug 180 is also operated to relieve pressure from the interior of the apparatus at the completion of operations, and when it is intended to completely remove the apparatus from the main.

The valve plug 180 is provided with a rotatable hand operated member or disc 188, to turn the plug, and a suitable stuffing box is provided around the plug to prevent escape from the valve housing.

In Figures 14, 16 and 17, a modification of the flop valve housing is shown which permits further shortening of the cylinder 28' which forms the tool inserting fluid chamber beyond the flop valve seat. The arrangement shown in these figures is substantially the same as that previously illustrated except that the flop valve housing 18' is of somewhat different design, as is the flop valve F' and its operating parts. The saddle 12 and packing 14 are positioned on the main 10 in the same manner as previously described, and the modified flop valve housing 18' is secured onto the housing 12 by the chains 114 in the manner described above. Furthermore, there is a bypass P', of any well known type, to control the passage of fluid from below to above the flop valve, which operates in the same general manner as hereinbefore discussed. The flop valve body has a globular enlargement forming a chamber 200 at one side of the flop valve seat and the outside of this chamber is covered by a removable globular cover plate 202, secured to the body by bolts, as shown. The chamber 200 is of such design and size, that the flop valve may be completely housed therein, as shown in dotted lines in Figure 14. The flop valve F' is provided with a circular sealing ring 204 to engage the valve seat, and may have a dished out portion or well 206, in order to permit shortening of the chamber above the valve, all as discussed above. The flop valve is carried on a substantially bifurcated right angular arm or lever 208 which is pivoted to an arm 210 by a pin 212, as shown in Figure 17. The arm 210 is in turn rigidly secured to the squared portion of an operating shaft 214, said shaft extending to the outside of the housing where it carries an operating hand piece 216 to turn the valve between open and closed positions.

The flop valve chamber 200 extends partially around the outside of the cylindrical guiding portion 220 of the flop valve body, and on opposite sides of said cylindrical portion 220, there are laterally aligned trunnion sockets 222 which carry pivot pins on which are pivoted curved links 224. There are two curved links 224, each located in chamber 200 outside of the cylindrical portion 220 of the flop valve body. Each link is pivoted at its opposite end, as at 225, to the flop valve. The links 224 are properly curved so that the flop valve can be moved to its seat by turning the operating shaft 214 until the valve assumes the position shown in the full lines of Figure 14. When the operating shaft 214 is turned counter-clockwise, as viewed in Figure 14, the arm 210 moves with shaft 214 to its dotted line position, and the curved links 224 cause the flop valve to be completely housed in the chamber 200 as indicated in dotted lines, substantially above or outwardly beyond the flop valve seat. Thus, the length of the flop valve body may be shortened from that shown in Figures 1 and 2, by housing the flop valve at the side of the body, rather than in a space below the flop valve seat. It will be apparent that the combination of the use of a flop valve with a dished out well and a housing which permits receiving of the valve at the side of the valve seat, permits substantial shortening of the flop valve body, as well as of the cylinder forming the fluid chamber above the flop valve seat.

It will be apparent that various changes may be made in the constructions shown herein without departing from the invention. Features not claimed herein are claimed in divisional applications Serial Nos. 422,768, 422,769, 422,770, 422,771, 422,772, 422,773, 422,774, all entitled "Drilling apparatus" and all filed December 12, 1941.

We claim:

In a drilling machine, a barrel, a downwardly faced valve seat in said barrel demarking upper and lower chambers, means closing the upper end of the upper chamber, a boring bar rotatable and reciprocable in a bore provided in said closing means, means limiting the upward movement of said bar, said upper chamber being of such restricted height that when said bar is in its upper limit position a part carried thereby at its lower end will project below said seat, and a flop valve swingable in said lower chamber and having a rim cooperative with said seat, said valve being dished within said rim to provide a well for the free accommodation of the lower end of said part when the valve is closed.

FRANK H. MUELLER.
WALTER J. BOWAN.